(12) United States Patent
Brown (10) Patent No.: US 6,428,831 B1
(45) Date of Patent: Aug. 6, 2002

(54) METHOD FOR STEAM FLAKING GRAIN

(75) Inventor: Davy Rolland Brown, Evans, CO (US)

(73) Assignee: Agland Incorporated, Eaton, CO (US)

( * ) Notice: Subject to any disclaimer, the term of this patent is extended or adjusted under 35 U.S.C. 154(b) by 0 days.

(21) Appl. No.: 09/903,164

(22) Filed: Jul. 11, 2001

Related U.S. Application Data (60) Provisional application No. 60/218,933, filed on Jul. 14, 2000.

(51) Int. Cl.$^7$ .............................. A23L 1/00; A23K 1/00
(52) U.S. Cl. ....................... 426/231; 426/510; 426/511; 426/518; 426/623
(58) Field of Search ................................ 426/231, 510, 426/511, 518, 623

(56) References Cited

U.S. PATENT DOCUMENTS

| | | |
|---|---|---|
| 174,346 A | 3/1876 | Beach |
| 2,064,701 A | 12/1936 | Stokkebye |
| 3,336,137 A | 8/1967 | Hickey |
| 3,342,607 A * | 9/1967 | Hickey ..................... 426/511 |
| 3,471,298 A | 10/1969 | Hirahara |
| 3,528,815 A | 9/1970 | Trotter |
| 4,661,365 A | 4/1987 | Malone |
| 5,744,186 A | 4/1998 | Harrison |
| 5,928,678 A | 7/1999 | Lund |

OTHER PUBLICATIONS

D.E. Johnson, J.K. Matsushima, & K.L. Knox, "Utilization of Flaked vs. Cracked Corn by Steers with Observations on Sarch Modification," Journal of Animal Science, 1968, pp. 1431–1437, Issue 27.

Daryl Lund, "Influence of Time, Temperature, Moisture, Ingredients, and Processing Conditions on Starch Gelatinization," CRC Critical Reviews in Food Science and Nutrition, 1985, pp. 249–273, vol. 20, Issue 4.

(List continued on next page.)

*Primary Examiner*—George C. Yeung
(74) *Attorney, Agent, or Firm*—Dorr, Carson, Sloan & Birney, P.C.

(57) ABSTRACT

A method steam flaking grain comprises the steps of providing grain, passing the grain through a steam chest at a predetermined temperature and pressure for a predetermined time, flaking the grain between two rotating corrugated rollers having a gap, sampling the flakes at predetermined intervals as the flakes come out from between the rollers, weighing the sampled flakes to determine the density of the sampled flakes, and adjusting the temperature, the pressure, the retention time, and the size of the gap between the rollers on the basis of the measured density of the sampled flakes, so that the resulting flakes have a predetermined density and a predetermined amount of gelatinization and so that the variability in the amount of gelatinization is minimized. In another highly preferred embodiment, the sampled flakes are cooled for a predetermined time and then screened before measuring the density.

22 Claims, 8 Drawing Sheets

OTHER PUBLICATIONS

C. Brent Theurer, "Grain Processing Effects on Starch Utilization by Ruminants," Journal of Animal Science, 1986, pp. 1649–1662, Issue 63.

F.N. Owens, R.A. Zinn, & Y.K. Kim, "Limits to Starch Digestion in the Ruminant Small Intestine," Journal of Animal Science, 1986, pp. 1634–1648, Issue 63.

R.A. Zinn, "Influence of Flake Density on the Comparative Feeding Value of Steam–Flaked Corn for Feedlot Cattle," Journal of Animal Science, 1990, pp. 767–775, Issue 68.

R.A. Zinn, "Influence of Steaming Time on Site of Digestion of Flaked Corn in Steers," Journal of Animal Science, 1990, pp. 776–781, Issue 68.

Kenneth Eng, "Research Examines Steam–Flaked Grains, Whole Corn Use in Rations," Feedstuffs, Apr. 20, 1992, p. 10.

Gerald B. Huntington, "Ruminant Starch Utilization Progress Has Been Extensive," Feedstuffs, Jun. 6, 1994, p. 16, 18, 39, 41, & 43.

A. Plascencia & R.A. Zinn, "Influence of Flake Density on the Feeding Value of Steam–Processed Corn in Diets for Lactating Cows," Journal of Animal Science, 1996, pp. 310–316, Issue 74.

C. Brent Theurer, Ruy Wanderley, & J.T. Huber, "Steam–Flaking Grains May Improve Nutritional Value," Feedstuffs, May 17, 1999, pp. 16–19.

"Steam Flaking: An Expensive Proposition with a Big Payoff," Beef Magazine 1984.

Loveland Industries, "Quality Control in Grain Processing: Evaluation for Flaking Quality Control," Grain Processing: An Informational Packet Concerning Grain Processing, Loveland Industries Inc., Greeley, Colorado, USA.

U.S. Provisional Patent Application of Davy Rolland Brown, Ser.1 No. 06/218,933, filed Jul. 14, 2000.

* cited by examiner

METHOD FOR STEAM FLAKING GRAIN

This application claims the benefit of U.S. Provisional Application No. 60/218,933, filed Jul. 14, 2000.

BACKGROUND OF THE INVENTION

1. Field of the Invention

The invention relates to steam-flaking grain for animal feed. Specifically it relates to a method for reducing the variability in the amount of gelatinization of steam-flaked grains.

2. Statement of the Problem

Grain has achieved popularity as a feed grain for feeding cattle both on feed lots to provide meat and in dairies for milk production. It has been found that the efficiency with which cattle can convert grain into weight gain or increased milk production can be enhanced by treating the grain prior to feeding. Even minute increases in feed efficiency will result in substantial dollar savings. For example, an average improvement of 6% from correctly steam-flaking corn potentially realized an estimated $750,000 to $1.5 million annually on 30,000 head of feedlot cattle.

A number of processes have consequently evolved for treating feed grain to increase the digestive efficiency of the grain. The digestive efficiency of grain can be increased by transforming the starches in the grains to more digestible compounds. The greatest increase in digestive efficiency has been obtained by the steam flaking process in which feed grain (such as corn, sorghum, wheat and barley) is subjected to steam in a closed steam chest at various pressures and times during which the grain absorbs moisture from the steam. The grain is then fed between pressure rollers to provide thin flakes. The improved digestive efficiency achieved by this process results from the fact that the moisturization, heat, and flaking gelatinizes (solubilizes) some of the starch granules of the grain so as to render them more digestible by cattle.

The main purpose for steam-flaking grain is to increase starch digestibility thereby maximizing net energy intake by cattle and subsequent performance. To achieve this, approximately 40% to approximately 60% (preferably about 500 to about 750 lb/ton of dry grain) of the starch in properly steam-flaked corn, for example, should be gelatinized compared with only 35% or less for steam-rolled or poorly steam-flaked grain. Grains low in gelatinized starch content can negatively impact profitability unless price is adjusted to offset the reduction in animal performance. Tables I and II illustrate the value of steam-flaked compared with steam-rolled corn in terms of gelatinized starch content and milking performance.

TABLE I

Value of processing based on the gelatinized starch content of steam-flaked compared with steam-rolled corn

| | Processing method | |
|---|---|---|
| Item | Steam-flaked corn[a] | Steam-rolled corn[a] |
| Total starch, % | 72.00 | 72.00 |
| Gelatinized starch, % | 56.00 | 35.00 |
| Gelatinized starch, lb/ton of grain | 701.57 | 438.48 |
| Flaked corn, $/ton[b] | 88.00 | 85.00 |
| Gelatinized starch, $/ton | 250.87 | 387.70 |

TABLE I-continued

Value of processing based on the gelatinized starch content of steam-flaked compared with steam-rolled corn

| | Processing method | |
|---|---|---|
| Item | Steam-flaked corn[a] | Steam-rolled corn[a] |
| Adjusted flaked corn, $/ton | 88.00 | 55.00 |
| Adjusted gelatinized starch, $/ton | 250.87 | 250.87 |

[a]Dry matter content of the whole grain was considered to be 87%.
[b]Steam flaking was considered to cost $3.00/ton more than steam rolling

TABLE II

Influence of steam flaking compared with steam rolling on milk production and profitability

| | Processing method[a] | |
|---|---|---|
| Item | Steam flaked | Steam rolled |
| Flaked grain intake, lb/hd/d | 10.00 | 10.00 |
| Flaked grain cost, $/cwt | 4.40 | 4.25 |
| Flaked grain cost, $/hd/d | .44 | .42 |
| Milk production, lb/hd/d | 80.00 | 76.00 |
| Milk revenue @ 12.00/cwt | 9.60 | 9.12 |
| IOGC, $/hd/d[b] | 9.16 | 8.70 |
| To equalize IOGC[b]: | | |
| Flaked grain cost, lb/hd/d | .44 | .20 |
| Milk production, $/hd/d | 80.00 | 78.00 |
| Milk revenue @ 12.00/cwt | 9.60 | 9.36 |
| IOGC, $/hd/d[b] | 9.16 | 9.16 |

[a]Steam flaking was considered to cost $3.00/ton more and increase milk production by 5% compared with steam rolling.
[b]IOGC = income over grain cost Thus, when grain is properly steam flaked (i.e., preferably about 56% gelatinized), milk production typically increases 5 to 6% compared with steam-rolled or poorly steam-flaked grain. Overall animal production (i.e., weight gain, milk production, and feed efficiency) was improved 5% to 16% when steam-flaked grains were fed compared with steam-rolled, dry-rolled, and ground forms of grain.

Improved animal performance by feeding steam-flaked grain is largely due to increased digestible energy intake from increased starch digestibility. During steam-flaking the starch in grain becomes gelatinized which increases its susceptibility to enzymatic and bacterial degradation in the ruminant (e.g., beef and dairy cattle) digestive tract. In ruminant animals the majority of starch is degraded in the rumen with a small amount passing through to the small intestine. The rate and extent to which ruminal starch digestion occurs is strongly influenced by the gelatinized starch content (i.e., processing degree) of the steam-flaked grain. Highly processed grains contain a high percentage of gelatinized starch that is rapidly degraded in the rumen. Feeding grain containing excessive amounts of gelatinized starch has been shown to depress animal performance or cause death due to digestive upset, acidosis, depressed feed intake, founder, and depressed digestibility of other nutrients, and it also increases milling costs. Under processing grain can increase the cost of animal production (if grain price is not appropriately adjusted) because reduced starch digestibility results in depressed feed efficiency.

To minimize the negative affects of under- or over-processing grain while at the same time improving efficiency of animal production, careful consideration should be given to each and every condition that is imposed during the steam-flaking process. Factors most strongly influencing conversion of starch to gelatinized starch are water, temperature, time, flake density, and grain quality. Starch will gelatinize (i.e., melt) when it is heated in the presence of water for a given period of time. As temperature rises water will penetrate the starch granule causing a change in its structure indicated by a loss of birefringence; by definition this is gelatinization. To permanently gelatinize the starch granule, cooking temperature, moisture, and mechanical force/pressure must work in combination to fracture it. If the granule is not fractured, upon cooling it will lose water and retrograde to a highly uniform structure.

Retrograded starch is lower in digestible energy compared with intact starch because it is extremely resistant to enzymatic and bacterial degradation.

Currently, there are no industry standards or indices that are followed to commercially produce steam-flaked grains for livestock with the explicit purpose to gelatinize starch to a targeted predetermined level and that minimize variability in the amount of gelatinization.

3. Solution to the Problem

In an effort to improve the efficiency of animal production and profitability of the livestock industry, a goal that has been long sought by the industry, the present invention comprises a unique method for commercially producing steam-flaked grains for the specific purpose of achieving targeted predetermined levels of gelatinized starch.

It is an object of the present invention to provide a method of steam-flaking grain that optimizes the amount of gelatinization in feed grain during the on-going processing of the grain.

It is a further object of the present invention to provide a method of steam-flaking grain that provides a predetermined level of gelatinization while minimizing variance in the amount of gelatinization during the steam flaking process.

SUMMARY OF THE INVENTION

The method of the present invention for steam flaking grain comprises in general the steps of providing grain, passing the grain through a steam chest at a predetermined temperature and pressure for a predetermined time, flaking the grain by passing it through a predetermined gap between two rotating corrugated rollers, sampling the flakes at predetermined intervals as the flakes come out from between the rollers, cooling the sampled flakes, weighing the sampled flakes to determine the density of the sampled flakes, and adjusting the temperature, the pressure, the retention time, and the size of the gap between the rollers on the basis of the measured density of the sampled flakes, so that the resulting flakes have a predetermined density and a predetermined amount of gelatinization. The method of the present invention thus minimizes the variability in the amount of gelatinization in the resulting steam-flaked grain.

DETAILED DESCRIPTION OF THE INVENTION

To improve animal digestive efficiency and the profitability of the livestock industry, the present invention delineates unique procedures and guidelines for commercially processing steam-flaked grains for the explicit purpose of achieving targeted levels of gelatinized starch.

Figure 1:
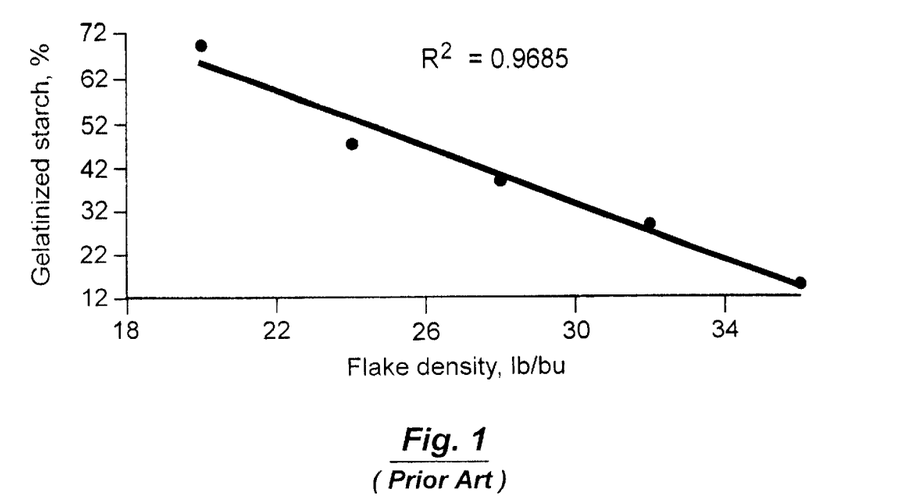
FIG. 1 (prior art) is a graph showing the relationship between gelatinized starch content and flake density of grain.

Starch in grain is primarily composed of amylose and amylopectin. The relative proportion of each influences the melting point of the starch granule. Starch in typical feed-grade grain contains approximately 70% amylose and 30% amylopectin, which will partially melt at temperatures in excess of 200 degrees F. in the presence of minimal moisture. After the grain is steamed, it is pressed between steel rolls (i.e., flaked) to facilitate gelatinization and to prevent or minimize retrogradation. The density to which the grain is flaked strongly influences its final gelatinized starch content (see FIG. 1, prior art). FIG. 1 shows the influence of flake density on the gelatinized starch content of corn steamed for the same amount of time, at the same temperature and moisture content. Variation in any of these factors will cause variation in the quality of the feed product. Since all of these factors (moisture content, temperature, time, flake density) interact, it is imperative that they be measured and controlled in an attempt to minimize variation so that feed value of processed grains may be optimized.

Figure 2:
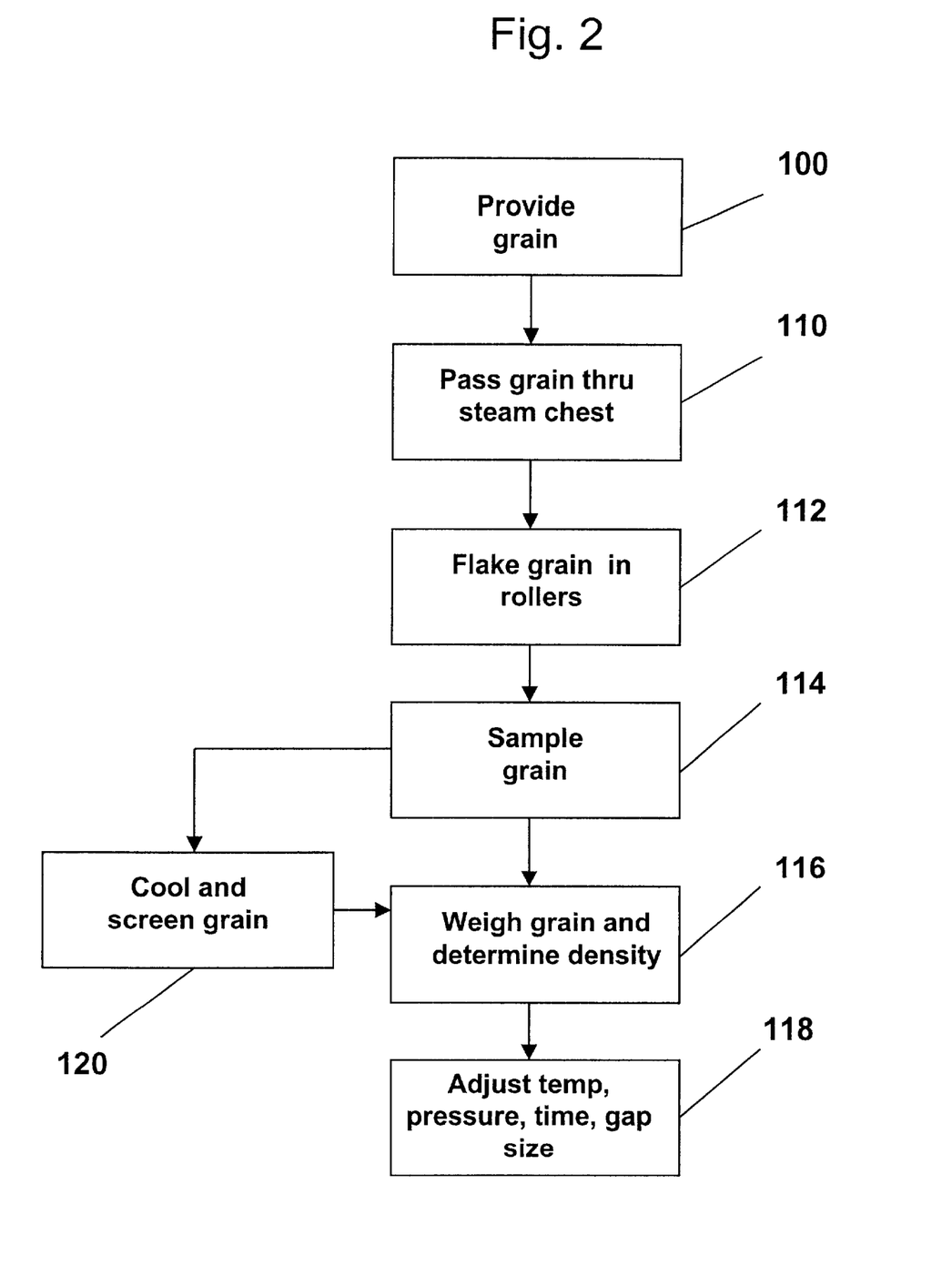
FIG. 2 shows a diagram of the method of the present invention.

The method of the present invention for steam flaking grain is shown in general outline in FIG. 2. The method comprises in general the steps of providing 100 grain, passing 110 the grain through a steam chest at a predetermined temperature and pressure for a predetermined time, flaking 112 the grain between two rotating corrugated rollers having a gap, sampling 114 the flakes at predetermined intervals as the flakes come out from between the rollers, weighing 116 the sampled flakes to determine the density of the sampled flakes, and adjusting 118 the temperature, the pressure, the retention time, and the size of the gap between the rollers on the basis of the measured density of the sampled flakes, so that the resulting flakes have a predetermined density and a predetermined amount of gelatinization. In another highly preferred embodiment, the sampled flakes 114 are cooled 120 for a predetermined time and then screened before weighing.

Figure 3:
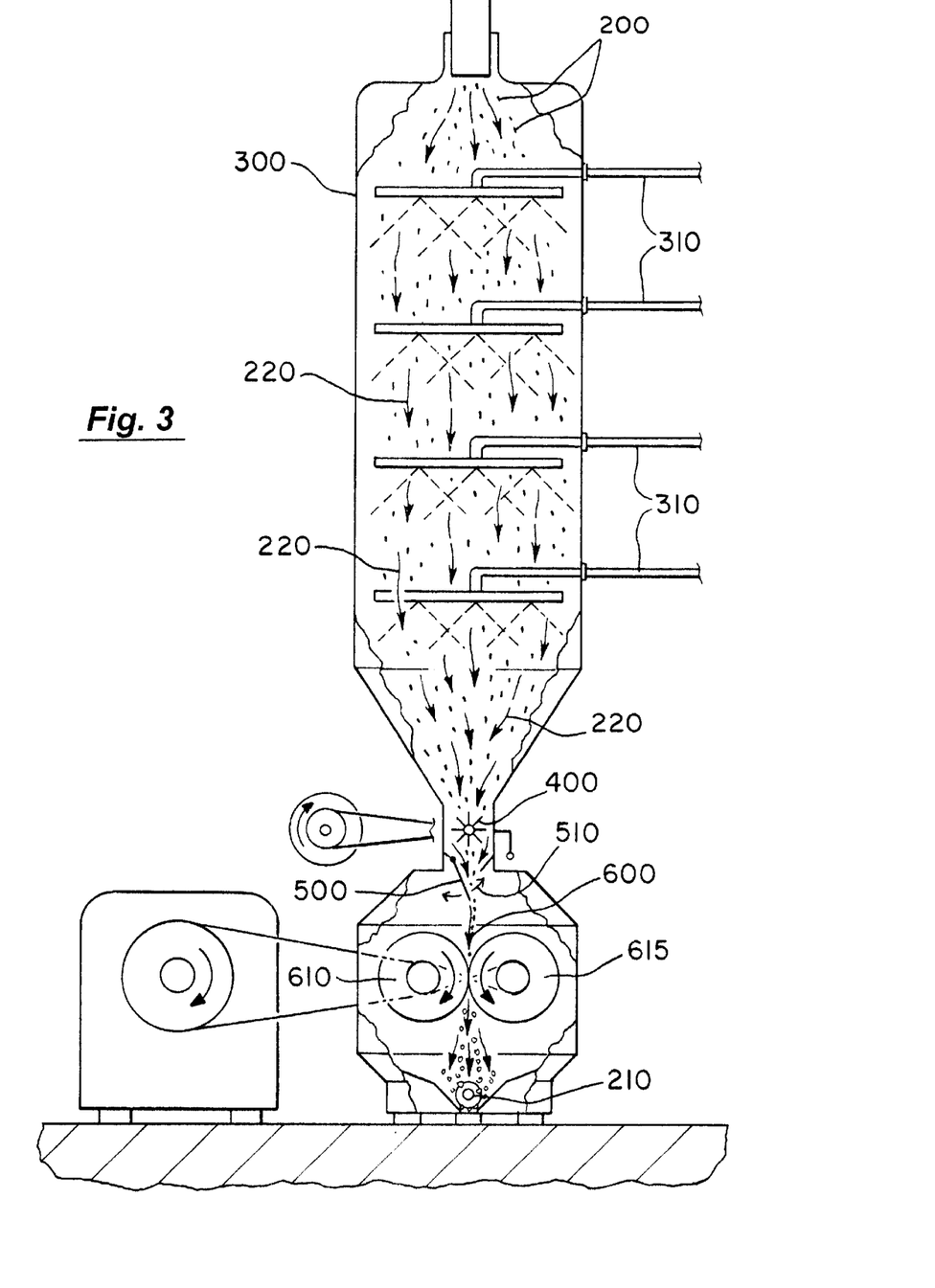
FIG. 3 is a cross-section of the apparatus for steam-flaking grain.
Figure 4:
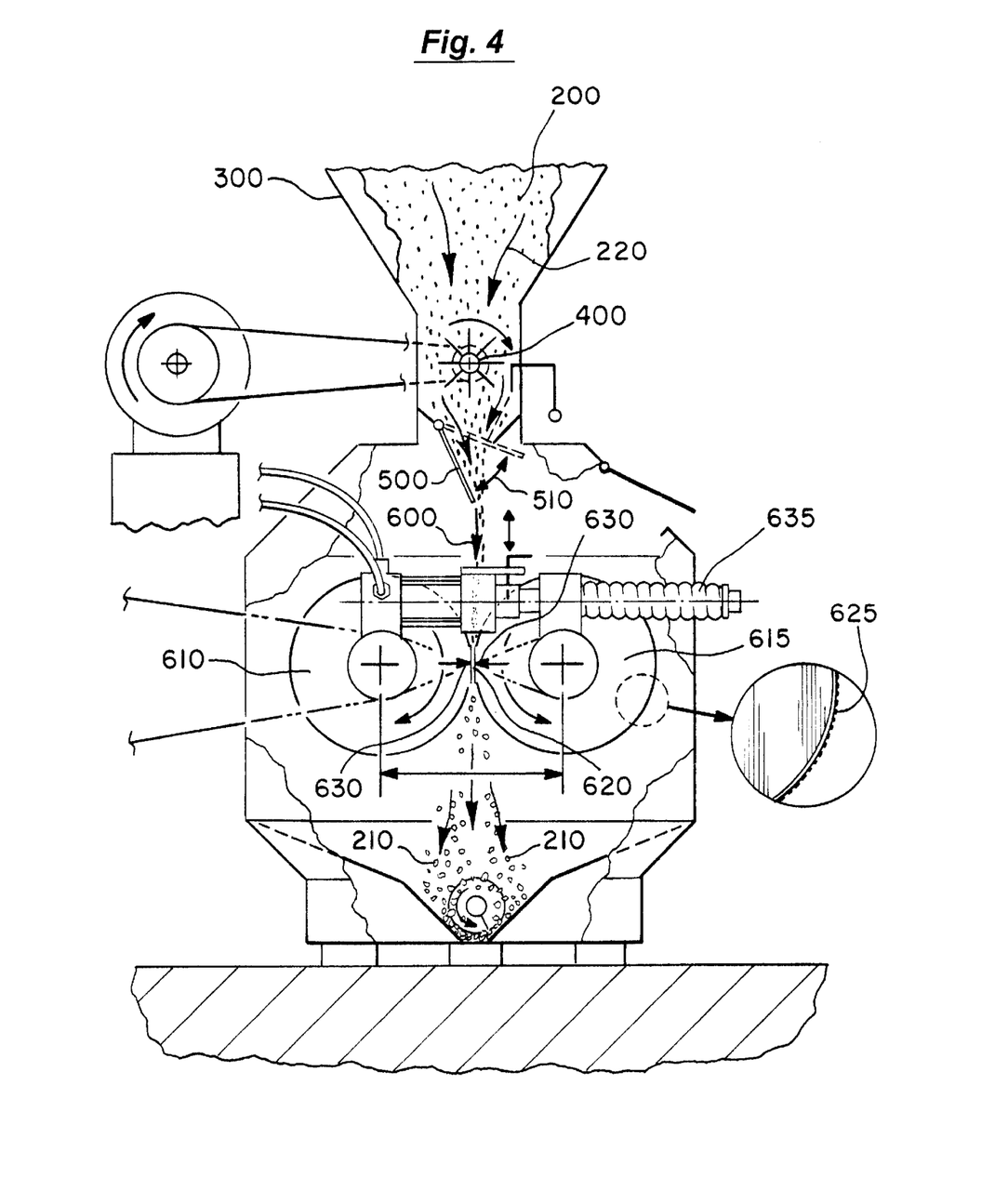
FIG. 4 is a cross-section of the apparatus of FIG. 3 showing greater detail.

To commercially produce specific levels of gelatinized starch in grain in a highly preferred embodiment of the present invention, shown in FIGS. 3 and 4, grain 200 is first provided in sufficient amounts for processing over a period of several hours. Since there is no single value for flake density that can be consistently used to achieve a consistent level of gelatinized starch in the final product because of variation in the quality of the feed-grain harvested for processing, the first step is to determine the quality of the grain 200, so that the initial parameters of temperature, time, and size of the gap between the rollers can be set appropriately. The grain 200 is then passed into and through a conventional steam chest 300 by conventional gravity feed 220.

Steam enters the steam chest 300 via steam delivery pipes 310 from a conventional boiler (not shown). The temperature in the steam chest 300 is preferably maintained between about 180 degrees F. and about 210 degrees F. by regulating the injection of steam into the steam chest 300. To maintain the appropriate steam chest temperature, the boiler pressure preferably is maintained between about 90 and about 105 psi. However, the pressure in the steam chest 300 is approximately at atmospheric pressure. In a highly preferred embodiment, the temperature range in the steam chest 300 is between 200 degrees F. and 210 degrees F. Temperature in the steam chest 300 is constantly observed and regulated to maintain a constant temperature during the steaming process.

Time of cooking is regulated in part by adjusting the speed of a pin-feeder 400 at the bottom of the steam chest 300 to maintain a preferable retention time of about 30 to about 40 minutes. In a highly preferred embodiment, retention time in the steam chest 300 is between about 35 and about 40 minutes. Grain 200 leaving the steam chest 300 falls first through an adjustable damper 500, which also can be moved 510 to narrow or expand the egress from the steam chest 300 and thus modify the retention time of the grain 200 in the steam chest 300. Retention time is also constantly observed and regulated to maintain a constant retention time during the steaming process.

After leaving the steam chest 300, the grain 200 falls (via gravity feed) 600 between two conventional steel rolls 610, 615. The rolls 610, 615 are preferably approximately 36 inches long and about 18 inches in diameter, although it is to be understood that rolls of other sizes can be used in the present invention. Each roll 610, 615 has corrugations 625 on its outer surface to assist in the flaking process. There are between 10 to 24 corrugations 625 per inch, and preferably rolls 610, 615 having between 16 to 18 corrugations per inch are used. The roll speed is conventionally set and is not an essential element of this embodiment of the present invention. A gap 620 between the rolls 610, 615 is varied 630 in size to assist in achieving a desired flake density. The gap 620 is varied 630 by moving the rolls 610, 615 by various conventional methods 635 that will be obvious to those skilled in the art, such as by hydraulics. Although the exact size of the gap 620 is not directly measured, preferably the gap 620 measures between about 2 mm and about 3 mm. The resulting flaked grain 210 falls from the bottom of the gap 620 and is transported by conventional methods to a storage container (not shown).

Figure 6:
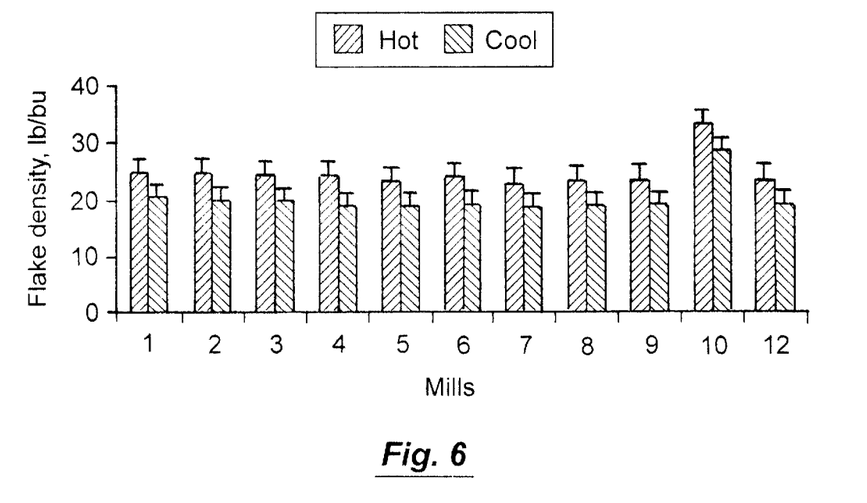
FIG. 6 is a graph showing the influence of cooling and screening flake samples on measurements of flake density.

In addition to holding cook-time and temperature reasonably constant as described above, measuring flake density by the method of the present invention is extremely critical to minimize variation in the gelatinized starch content in the final product. Minimizing the variation in the amount of gelatinization in the steam-flaked grain is the purpose of the present invention. Flakes 210 are sampled for measuring flake density by obtaining flakes 210 directly beneath the gap at various places along the length of the rolls 610, 615, and at least at each end of the rolls 610, 615 as the flakes 210 are extruded from the gap 620. It is important to obtain flakes 210 from at least both ends of the rolls 610, 615 so that the gap 620 between the rolls 610, 615 can be set to be parallel along its length. The flakes 210 are sampled about every 30 minutes to about every 60 minutes during the processing period. The sampled flakes 210 are then preferably spread onto a clean surface to cool for at least 2 minutes and preferably for about 10 min. After cooling down, the flakes 210 are screened. Although cooling and screening the flakes 210 is not essential to the method of the present invention, as can be seen in FIG. 6, cooling and screening the flakes 210 decreases the variation in flakes 210 by about 16%, thus decreasing variation in the subsequent flake density measurement.

Figure 5:
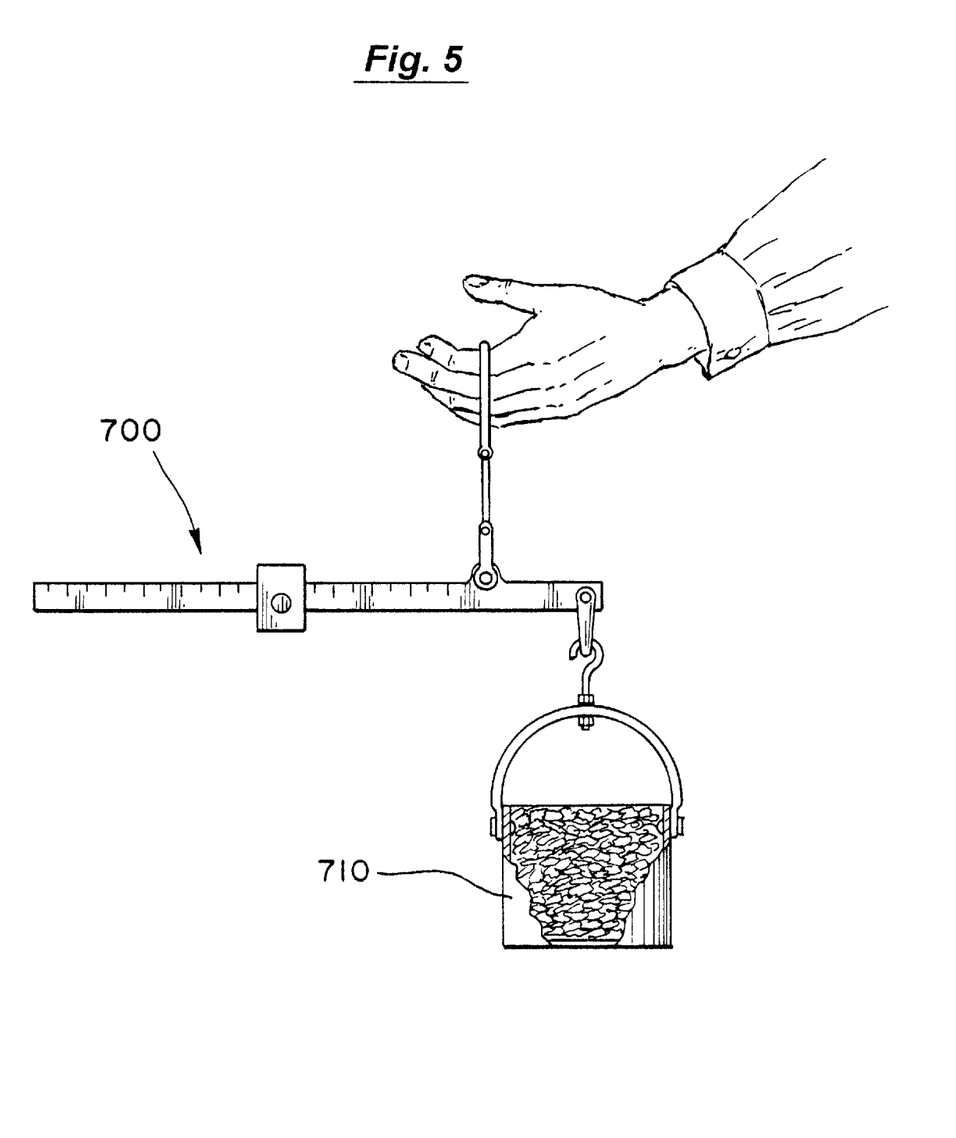
FIG. 5 shows the method of weighing the flaked grain sample to determine the density of the flaked grain.
Figure 7:
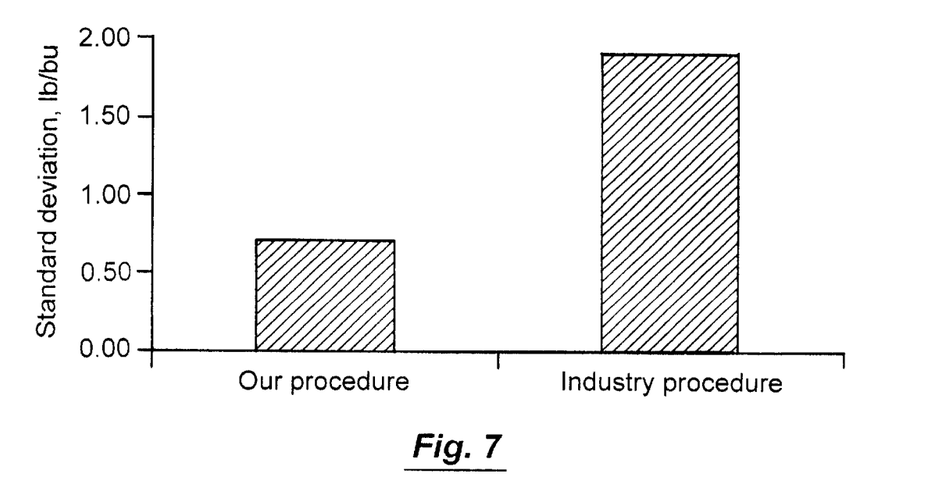
FIG. 7 is a graph comparing variation in flake density between the present invention and conventional methods.
Figure 8:
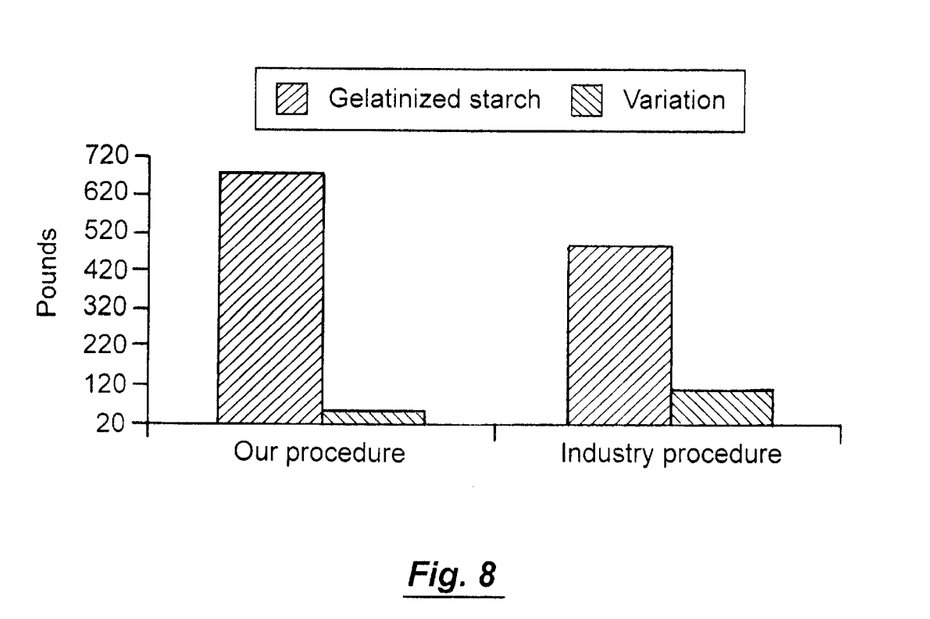
FIG. 8 is a graph comparing amounts of gelatinized starch and variability in amounts of gelatinized starch between the present invention and conventional methods.

The sampled flakes 210 are then lightly placed into a conventional hand-held weight-per-bushel tester 700 as shown in FIG. 5 for weighing and determination of flake density (lb/bu). Measuring flake density in this way allows mill operators to set precisely the gap 620 between the rolls 610, 615, which minimizes variation in the quality of the final product. Increased variation in flake density resulting from conventional industry procedures gives rise to highly variable levels of gelatinized starch in the final product, whereas the method of the present invention reduces variation in flake density by up to 63% (see FIGS. 7 and 8) and thus increases the amount of gelatinized starch by 28% over conventional industry procedures (FIG. 8), thereby decreasing variability in the animal response and reducing costs of feeding.

Unfortunately, there is no single value for flake density that can be consistently used to achieve a consistent level of gelatinized starch in the final product because of variation in the quality of the feed-grain harvested for processing. To achieve a consistent level of gelatinized starch in the final product we target flake densities ranging from 26 to 32 lb/bushel for corn and sorghum and 34 to 40 lb/bushel for barley and wheat.

In a preferred embodiment of the present invention, the targeted levels of gelatinized starch in grain are about 40% to about 60% (preferably about 500±40 to about 750±30 lbs/ton of dry grain) for steam-flaked corn and sorghum, and about 35% to about 50% (about 318±25 to about 460±30 lbs/ton of dry grain) for steam-flaked wheat and barley. (Steam-flaked barley and wheat are processed to a lesser extent than is corn because the type of starch in wheat and barley is more susceptible to degradation by rumen microbes.)

In a highly preferred embodiment of the present invention, corn and sorghum steam flaked according to the method of the present invention have about a 56% gelatinization level and wheat and barley steam flaked according to the present invention have about a 44% gelatinization level.

After the flake density is determined by the above-described method, the variables of steam temperature, retention time, and the gap are adjusted on the basis of said density of said sampled flakes, so that said flakes have a predetermined density and a predetermined amount of gelatinization as indicated above. The method of the present invention thus minimizes the variability in the amount of gelatinization in the resulting steam-flaked grain.

Table III shows the causal association between the variables measured during flaking:

TABLE III

Pearson correlation coefficients showing the causal association between variables measured during flaking

| Item | Pin feeder motor speed | Temp | Retention time, min | Boiler pressure, psi | Fines | Dry matter top[a] |
|---|---|---|---|---|---|---|
| Flake density, lb/bu | .417 | | | | | |
| Retention time, min | −.429 | | | | | |
| Boiler pressure, psi | | | −.566 | | | |
| Fines, % | | .619 | | | | |
| Dry matter, top[a] | | | | | | .404 |
| Dry matter, lower[a] | .454 | .729 | | | | |
| Moisture, g/100 g | | .455 | | | | .801 |
| Dry matter, lb/h | .496 | | −.957 | .537 | | |

[a]Dry matter content of grain 200 at the top and bottom of steam chest 300

Table IV shows the nutrient content of steam-flaked corn prepared by the method of the present invention:

TABLE IV

Nutrient content of steam-flaked corn prepared by the method of the present invention

| | Steam-flaked corn (±SD) | |
|---|---|---|
| Item | Study A | Study B |
| Dry matter, % | 84.7 (0.31) | 83.4 (0.23) |
| Crude protein, % | 8.7 (0.22) | 8.5 (0.15) |
| Glucose availability, % | 58.1 (1.74) | 69.0 (1.06) |
| Degree of processing, % | 68.0 (1.87) | |
| Gelatinized starch, % | 50.9 (1.99) | 63.7 (1.41) |
| Gelatinized starch, lb/ton (DMb) | 679.7 (26.93) | 845.4 (17.17) |

Figure 9A:
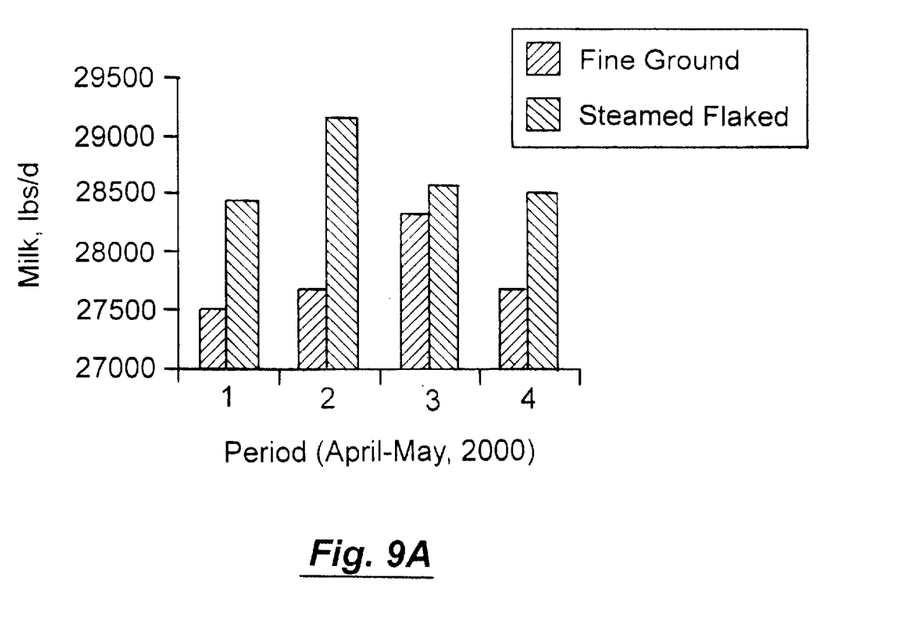
FIG. 9A and FIG. 9B are graphs showing milk production in cattle fed grain processed by the method of the present invention compared with milk production of cattle fed conventionally processed (fine ground) grain products.
Figure 9B:
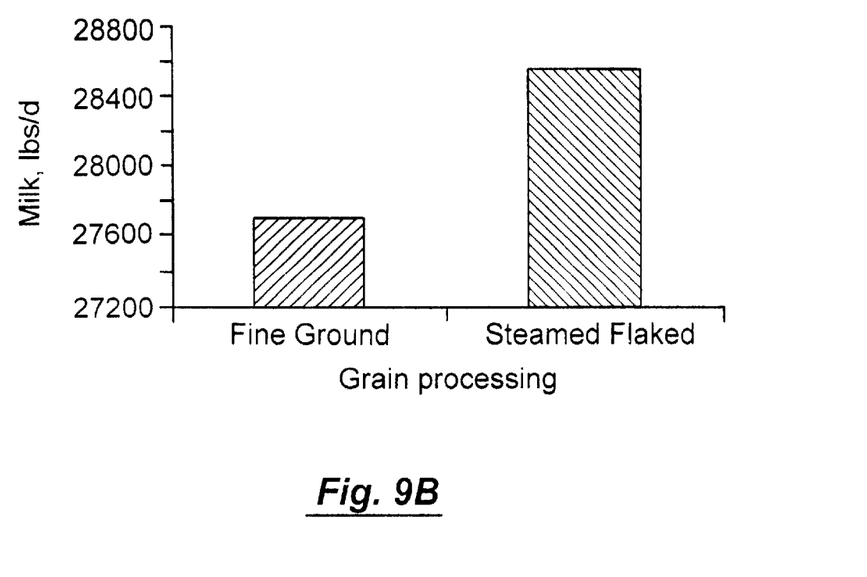

FIGS. 9A and 9B provides results comparing milk production by cattle fed finely ground corn versus cattle fed steam-flaked corn prepared by the method of the present invention. Milk production increased significantly, that is, replacing 1:1 finely ground corn with steam-flaked corn prepared by the method of the present invention increased herd milk production by 845 lb/day (P<0.0001) in field observations.

Figure 10:
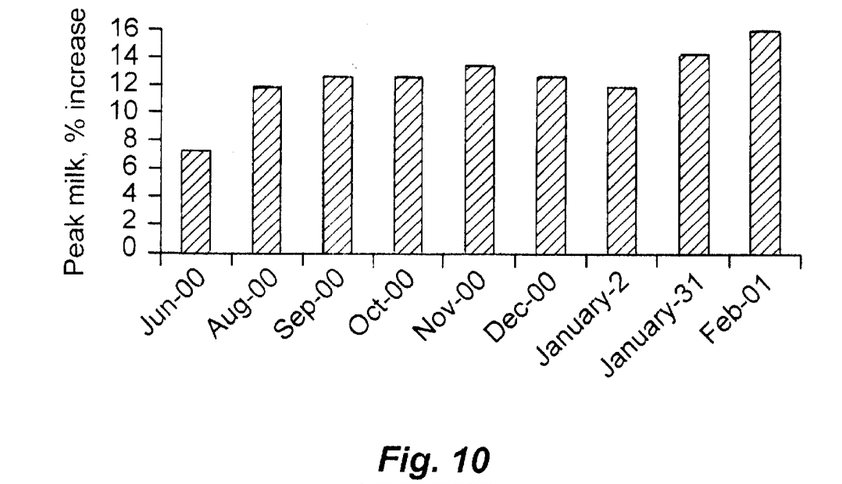
FIG. 10 is a graph showing the percent increase in peak-milk yield over nine months in cattle fed steam-flaked grain processed by the method of the present invention.

FIG. 10 shows the results in peak milk yield over a period of months in cattle fed steam-flaked grain processed by the method of the present invention. Average peak-milk increase more than 15% over the period.

Figure 11:
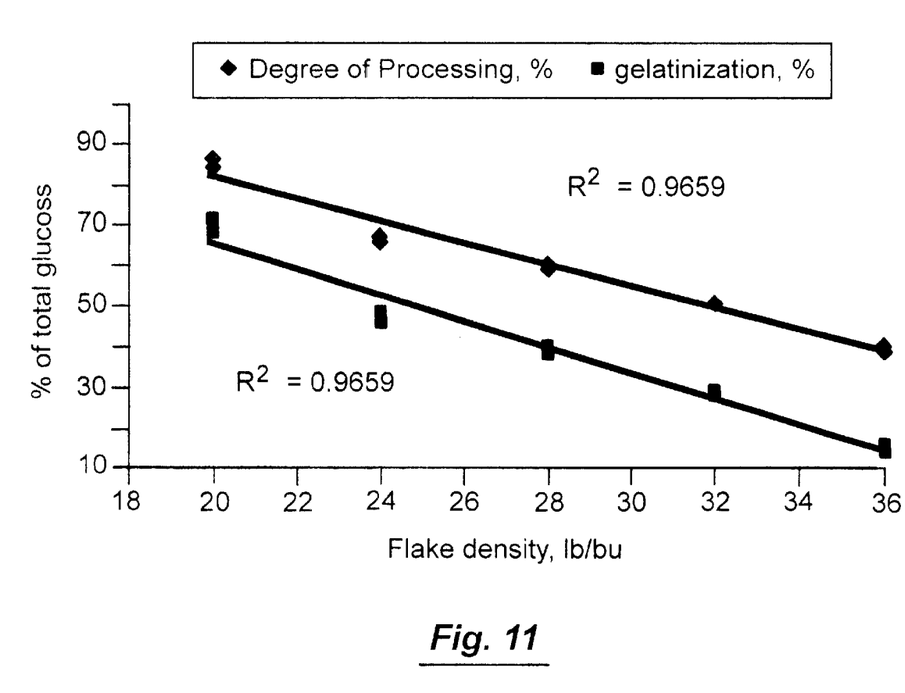
FIG. 11 is a graph indicating the correlation between flake density and percentage of total glucose.

FIG. 11 indicates how the percentage of total glucose in steam-flaked corn varies with the flake density. The degree of processing and the percentage of gelatinization are also shown.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

I claim:

1. A method for steam flaking grain comprising the steps of:

providing grain;

passing said grain through a steam chest at a temperature between about 180 degrees F. and 210 degrees F. with a retention time of between about 30 minutes and about 40 minutes;

flaking said grain between two rotating corrugated rollers having a gap therebetween;

sampling said flakes at predetermined intervals as said flakes come out from said gap;

cooling said sampled flakes;

weighing said sampled flakes to determine the density of said sampled flakes; and adjusting said temperature, said retention time, and said gap on the basis of said density of said sampled flakes, so that said flakes have a predetermined density and a predetermined amount of gelatinization.

2. The method of claim 1 wherein said gap is between about 2 mm and about 3 mm.

3. The method of claim 1 further comprising the step of screening said sampled flakes after cooling.

4. The method of claim 1 wherein said sampling at said predetermined intervals is done between every 30 minutes and every 60 minutes.

5. The method of claim 1 wherein said grain is selected from the group consisting of corn and sorghum and said predetermined density is between about 26 lb/bu and about 32 lb/bu.

6. The method of claim 1 wherein said grain is selected from the group consisting of corn and sorghum and said predetermined gelatinization is between about 40% and about 60%.

7. The method of claim 6 wherein said predetermined gelatinization is about 56%.

8. The method of claim 1 wherein said grain is selected from the group consisting of wheat and barley and said predetermined density is between about 34 lb/bu to about 40 lb/bu.

9. The method of claim 1 wherein said grain is selected from the group consisting of wheat and barley and said predetermined gelatinization is between about 35% and about 50%.

10. The method of claim 9 wherein said predetermined gelatinization is about 44%.

11. Grain prepared by the method of claim 1.

12. A method for steam flaking grain comprising the steps of:

providing grain;

passing said grain through a steam chest at a temperature between about 180 degrees F. and about 210 degrees F. with a retention time of between about 30 minutes and about 40 minutes;

flaking said grain between two rotating corrugated rollers having a gap therebetween of about 2 mm to about 3 mm;

sampling said flakes as said flakes come out from said gap;

cooling said sampled flakes;

screening said sampled flakes;

weighing said sampled flakes to determine the density of said sampled flakes; and adjusting said temperature, said retention time, and said gap on the basis of said density of said sampled flakes, so that said flakes have a predetermined density and a predetermined amount of gelatinization.

13. The method of claim 12 wherein said grain is selected from the group consisting of corn and sorghum and said predetermined density is between about 26 lb/bu and about 32 lb/bu.

14. The method of claim 12 wherein said grain is selected from the group consisting of corn and sorghum and said predetermined amount of gelatinization is between about 40% and about 60%.

15. The method of claim 14 wherein said predetermined amount of gelatinization is about 56%.

16. The method of claim 12 wherein said grain is selected from the group consisting of wheat and barley and said predetermined density is between about 34 lb/bu and about 40 lb/bu.

17. The method of claim 12 wherein said grain is selected from the group consisting of wheat and barley and said predetermined amount of gelatinization is between about 35% and about 50%.

18. The method of claim 17 wherein said predetermined amount of gelatinization is about 44%.

19. The method of claim 12 wherein said sampling at said predetermined intervals is done between every 30 minutes and every 60 minutes.

20. Grain prepared by the method of claim 12.

21. A method for steam flaking grain comprising the steps of:

providing grain;

passing said grain through a steam chest at a temperature between about 200 degrees F. and about 210 degrees F. with a retention time of between about 35 minutes and about 40 minutes;

flaking said grain between two rotating corrugated rollers having a gap therebetween of about 2 mm to about 3 mm;

sampling said flakes as said flakes come out from said gap;

cooling said sampled flakes;

screening said sampled flakes;

weighing said sampled flakes to determine the density of said sampled flakes; and adjusting said temperature, said retention time, and said gap on the basis of said density of said sampled flakes, so that said flakes have a predetermined density and a predetermined amount of gelatinization so that said flakes have a predetermined density and a predetermined amount of gelatinization and so that the variability in said predetermined amount of gelatinization is minimized.

22. Grain prepared by the method of claim 21.

* * * * *